(12) United States Patent
Hui et al.

(10) Patent No.: US 8,040,103 B2
(45) Date of Patent: Oct. 18, 2011

(54) BATTERY CHARGING APPARATUS WITH PLANAR INDUCTIVE CHARGING PLATFORM

(75) Inventors: Shu-Yuen Ron Hui, Shatin (HK); Xun Liu, Guizhou Province (CN)

(73) Assignee: City University of Hong Kong, Kowloon (HK)

( * ) Notice: Subject to any disclaimer, the term of this patent is extended or adjusted under 35 U.S.C. 154(b) by 813 days.

(21) Appl. No.: 12/063,986

(22) PCT Filed: Aug. 18, 2006

(86) PCT No.: PCT/CN2006/002100
§ 371 (c)(1),
(2), (4) Date: Apr. 8, 2008

(87) PCT Pub. No.: WO2007/019806
PCT Pub. Date: Feb. 22, 2007

(65) Prior Publication Data
US 2008/0278112 A1    Nov. 13, 2008

(30) Foreign Application Priority Data
Aug. 19, 2005 (GB) .................................. 0517082.4

(51) Int. Cl.
*H01M 10/46*    (2006.01)
(52) U.S. Cl. .......................................... 320/108
(58) Field of Classification Search ................. 320/107, 320/108, 114, 115
See application file for complete search history.

(56) References Cited

U.S. PATENT DOCUMENTS

| 5,353,001 | A | 10/1994 | Meinel et al. | |
|---|---|---|---|---|
| 6,529,389 | B2 | 3/2003 | Perlick et al. | |
| 6,870,475 | B2 * | 3/2005 | Fitch et al. | 320/108 |
| 7,026,905 | B2 * | 4/2006 | Haugs et al. | 336/220 |
| 2004/0000974 | A1 | 1/2004 | Odenaal et al. | 333/219 |
| 2004/0113741 | A1 * | 6/2004 | Li et al. | 336/212 |
| 2004/0135661 | A1 * | 7/2004 | Haugs et al. | 336/212 |

FOREIGN PATENT DOCUMENTS

| CN | 1363940 | 8/2002 |
|---|---|---|
| WO | WO 2004/003888 A1 | 1/2004 |

OTHER PUBLICATIONS

International Search Report from International Application No. PCT/CN2006/002100 completed Oct. 20, 2006, and mailed on Nov. 23, 2006.

(Continued)

*Primary Examiner* — Edward Tso
(74) *Attorney, Agent, or Firm* — Heslin Rothenberg Farley & Mesiti P.C.

(57) ABSTRACT

A battery charging apparatus comprises an inductive charging platform including a charging surface on which an electrical device to be charged is to be placed, and a first winding for generating lines of magnetic flux generally perpendicular to the charging surface. To compensate for voltage sag caused by a reduction in the flux generated by the first winding, a second winding is located within an area defined by the first winding for generating an auxiliary magnetic flux generally perpendicular to the charging surface.

16 Claims, 6 Drawing Sheets

OTHER PUBLICATIONS

Choi, et al., "Design and Implementation of Low-Profile Contactless Battery Charger Using Planar Printed Circuit Board Windings as Energy Transfer Device," IEEE Transactions on Industrial Electronics, Feb. 2004, pp. 140-147, vol. 51, No. 1.

Liu, et al., "Finite Element Simulation of a Universal Contactless Battery Charging Platform," Department of Electronic Engineering, City University of Hong Kong, pp. 1927-1932.

Tang, et al., "Coreless printed circuit board (PCB) transformers with high power density and high efficiency," Electronics Letters, May 25, 2000, pp. 943-944, vol. 36, No. 11.

Hui, et al., "Coreless Printed Circuit Board (PCB) Transformers for Power MOSFET/IGBT Gate Drive Circuits," IEEE Transactions on Power Electronics, May 1999, pp. 422-430, vol. 14, No. 3.

Tang, et al., "Coreless Printed Circuit Board (PCB) Transformers with Multiple Secondary Windings for Complementary Gate Drive Circuits," IEEE Transactions on Power Electronics, May 1999, pp. 431-437, vol. 14, No. 3.

Hui, et al., "Optimal Operation of Coreless PCB Transformer-Isolated Gate Drive Circuits with Wide Switching Frequency Range," IEEE Transactions on Power Electronics, May 1999, pp. 506-514, vol. 14, No. 3.

Tang, et al., "Coreless Planar Printed-Circuit Board (PCB) Transformers—A Fundamental Concept for Signal and Energy Transfer," IEEE Transactions on Power Electronics, Sep. 2000, pp. 931-941, vol. 15, No. 5.

\* cited by examiner (a)

(b)

BATTERY CHARGING APPARATUS WITH PLANAR INDUCTIVE CHARGING PLATFORM

CROSS-REFERENCE TO RELATED APPLICATIONS

This application is a continuation of PCT Application PCT/CN2006/002100, filed Aug. 18, 2006, and published under the PCT Articles in English as WO 2007/019806 A1 on Feb. 22, 2007. PCT/CN2006/002100 claimed priority to Great Britain Application No. 0517082.4, filed Aug. 19, 2005. The entire disclosures of PCT/CN2006/002100 and Great Britain Application No. 0517082.4 are incorporated herein by reference in their entirety.

FIELD OF THE INVENTION

The present invention relates to apparatus for the contactless charging of electrical and electronic devices, and in particular to such apparatus having a planar charging surface with improved charging performance.

BACKGROUND OF THE INVENTION

Portable electronic equipment such as mobile phones and personal digital assistants (PDA) usually use rechargeable batteries. Power adaptors (or AC-DC power converters) are traditionally used to charge the batteries in the electronic equipment. Due to the wide range of portable electronic products, many people nowadays have a wide range of power adaptors because there is no standard for charging different types of portable electronic equipment.

Recently, a number of types of planar inductive charging platforms have been proposed. One example is described in GB2399225A which generates an AC electromagnetic flux 1 with the flux lines flowing "horizontally" along the charging surface 2 as shown in FIG. 1A. A distributed winding is used in this charging platform for generating the AC flux. This principle is in fact similar to the AC electromagnetic flux generated in a cylindrical motor, except that the cylindrical structure is compressed into a flat pancake shape. As the flux needs to flow horizontally along the upper and lower surfaces, two inherent limitations arise.

Firstly, an electromagnetic flux guide must be used to guide the flux along the bottom surface. This is usually a layer of soft magnetic material such as ferrite or amorphous alloy. In order to provide sufficient flux, this layer must be "thick" enough so that the flux can flow along the layer of soft magnetic material without magnetic saturation. Secondly, a similar problem applies to the secondary device that has to pick up to flux (and energy) on the upper surface of the charging platform.

FIG. 1B shows the device required for the charging platform of FIG. 1A. This consists of a magnetic core 3 and a winding. In order for the winding to sense the AC flux, the flux must flow into the cross-sectional area (shaded in FIG. 1B). Therefore, this cross-sectional area must be large enough so that enough flux and energy can be picked up by the secondary device. It should be noted that this secondary device must be housed inside the electronic equipment to be charged on the charging platform. The thickness of the secondary device is crucial to the applicability and practicality of the device. If it is too thick, it simply cannot be housed in the electronic equipment.

Another type of planar inductive battery charging platform is described in GB2389720A. Unlike GB2399225A, the charging platform described in GB2389720A uses a multi-layer planar winding array to generate an AC flux 4 that has almost uniform magnitude over the entire charging surface 5. The lines of flux of this charging platform flow "perpendicularly" in and out of the charging surface as shown in FIG. 2. This perpendicular flow of flux is very beneficial because it allows energy transfer over the surface on which the electronic equipment (to be charged) is placed.

For both planar charging platforms described above, it is necessary to use an electromagnetic shield 6 on the bottom surface. If the charging platform is placed on a metallic desk, the AC flux generated in the charging platform may induce currents in the metallic desk, resulting in incorrect energy transfer and even heating effects in the metallic desk. U.S. Pat. No. 6,501,364 has been shown to be an effective electromagnetic shield for this type of planar charging platform. The electromagnetic shield in U.S. Pat. No. 6,501,364 simply consists of a thin layer of soft magnetic material (such as ferrite) and a thin layer of conductive material (such as copper).

Regarding energy transfer from the planar surface, one coreless printed-circuit-board (PCB) transformer technology pioneered by Hui and Tang [EP935263A; Chung, H., "Coreless printed-circuit board transformers for signal and energy transfer," Electronics Letters, Volume: 34 Issue: 11, 28 May 1998, Page(s): 1052-1054; Hui, S. Y. R.; Henry Shu-Hung Chung; Tang, S. C., "Coreless printed circuit board (PCB) transformers for power MOSFET/IGBT gate drive circuits," IEEE Transactions on Power Electronics, Volume: 14 Issue: 3, May 1999, Page(s): 422-430; Tang, S. C.; Hui, S. Y. R.; Henry Shu-Hung Chung, "Coreless printed circuit board (PCB) transformers with multiple secondary windings for complementary gate drive circuits," IEEE Transactions on Power Electronics, Volume: 14 Issue: 3, May 1999, Page(s): 431-437; Hui, S. Y. R.; Tang, S. C.; Henry Shu-Hung Chung, "Optimal operation of coreless PCB transformer-isolated gate drive circuits with wide switching frequency range," IEEE Transactions on Power Electronics, Volume: 14 Issue: 3, May 1999, Page(s): 506-514; Tang, S. C.; Hui, S. Y. R.; Henry Shu-Hung Chung, "Coreless planar printed-circuit-board (PCB) transformers-a fundamental concept for signal and energy transfer," IEEE Transactions on Power Electronics, Volume: 15 Issue: 5, September 2000, Page(s): 931-941] has been proven to be an effective way.

Based on two planar windings on two parallel planes as shown in FIG. 3, it has been shown that both energy and signal can be transferred from one planar winding to another. This planar PCB transformer technology has been applied in a range of applications. In 2004, it was used by for a contactless battery charger for mobile phone in Choi B., Nho J., Cha H. and Choi S., "Design and implementation of low-profile contactless battery charger using planar printed circuit board windings as energy transfer device," IEEE Transactions on Industrial Electronics, vol. 51, No. 1, February 2004, pp. 140-147. Choi et al uses one planar winding as a primary charging pad and a separate planar winding as a secondary winding as shown in FIGS. 4A and 4B. FIG. 5 shows the equivalent electrical circuit diagram of this contactless charging system. As explained in Choi et al, the circuit operation of the coreless PCB transformer is based on the theory proposed by Hui et al. It should be noted that the primary circuit is based on the resonant circuit described in Hui et al, while the front power stage of the secondary circuit is a standard winding with a diode rectifier that provides the rectified DC voltage for the charging circuit.

Two main problems suffered by the charging system of FIG. 5 proposed by Choi et al include: (1) The planar winding of the secondary module must be placed directly on top of the planar winding of the primary unit. If it is slightly misplaced, the energy transfer will be seriously hampered; (2) The use of one spiral planar winding in the secondary module to pick up energy emitted from the primary winding requires the choice of switching frequency to be very high. In Choi et al, the operating frequency has to be 950 kHz. Such high switching frequency leads to high switching loss in the primary inverter circuit, high AC resistance in the PCB copper tracks and more importantly high electromagnetic interference (EMI) emission.

Problem (1) can be solved by using a planar inductive charging platform based on a multi-layer planar winding array structure, which allows the charged electronic equipment to be placed anywhere on the charging surface as described in GB2389720A. However requiring a multi-layer charging platform increases the complexity of the charging platform undesirably.

A planar inductive battery charging platform that generates magnetic field with lines of flux flowing perpendicular to the planar surface (FIG. 2) can be constructed in two ways. The first and simplest way is to excite a coil with an AC power source as shown in FIG. 6A. A second method is to use a multi-layer winding matrix structure as shown in FIG. 6B similar to that described in GB2389720A. However, in both cases, it has been pointed out (Liu, X.; Chan, P. W.; Hui, S. Y. R.; "Finite element simulation of a universal contactless battery charging platform," IEEE Applied Power Electronics Conference 2005, APEC 2005, Volume 3, 6-10 Mar. 2005 Page(s): 1927-1932) that a central voltage sag phenomenon exists. In practice, a secondary module (or energy receiving element) is used to pick up the energy for charging the load. FIG. 7 shows that in one practical experimental setup, the rectified DC voltage picked up by a secondary module on the planar surface is not entirely uniform over the planar surface and in particular is reduced in the central part of the planar surface. This is known as central voltage sag phenomenon. This voltage sag increases as the surface area of the charging area increases.

SUMMARY OF THE INVENTION

According to the present invention there is provided a battery charging apparatus comprising an inductive charging platform including a charging surface on which an electrical device to be charged is to be placed, a first winding for generating lines of magnetic flux generally perpendicular to the charging surface, and a second winding located within an area defined by the first winding for generating an auxiliary magnetic flux generally perpendicular to the charging surface, such that magnetic flux generated by the second winding compensates for a reduction in magnetic flux generated by the first winding, thereby generating magnetic flux substantially uniformly over the surface of the charging platform.

In preferred embodiments of the invention the second winding is located such that flux generated by the second winding compensates for a reduction in flux generated by the first winding. In many cases this will imply that the second winding is located concentrically with respect to the first winding, though other positions may be necessary depending on the shape of the first winding and the resulting flux pattern.

The first and second windings may be planar windings preferably located in the same plane, or may be planar windings located in parallel planes.

The first and second windings may be formed as conductive coils, or may be formed as conductive tracks on one or more printed circuit boards.

The first and second windings may be connected together in series or in parallel, and may be driven in the same phase and the same polarity or may be driven independently.

The first winding may preferably extend about the periphery of the charging surface and the second winding may be located at the center of the charging surface. Preferably the second winding is a spiral winding. The first winding and the second winding may be generally rectangular or circular.

In cases where a single second winding is insufficient to compensate for voltage sag, a third winding is provided located within said area defined by said first winding.

BRIEF DESCRIPTION OF THE DRAWINGS

Some embodiments of the invention will now be described by way of example and with reference to the accompanying drawings, in which.

DETAILED DESCRIPTION OF PREFERRED EMBODIMENTS

In order to compensate for the voltage sag phenomenon in the central area of the planar inductive battery charging platform, according to embodiments of the present invention a second auxiliary winding can be placed in the central region of the charging surface in order to boost the electromagnetic flux in that region to compensate for the voltage sag phenomenon.

Figure 1A:
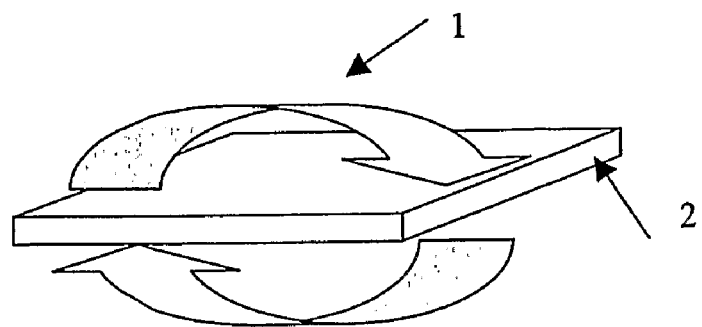
FIGS. 1A and 1B show respectively a prior art inductive battery charging platform and a corresponding secondary energy receiving element for use therewith.
Figure 1B:
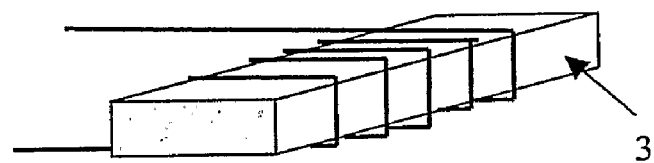
Figure 2:
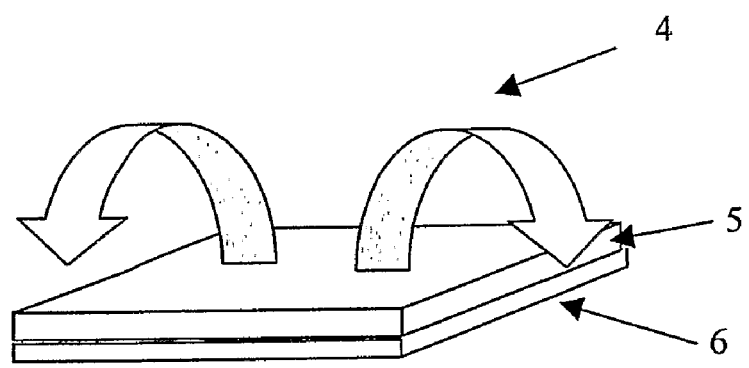
FIG. 2 shows another form of prior art inductive battery charging platform.
Figure 3:
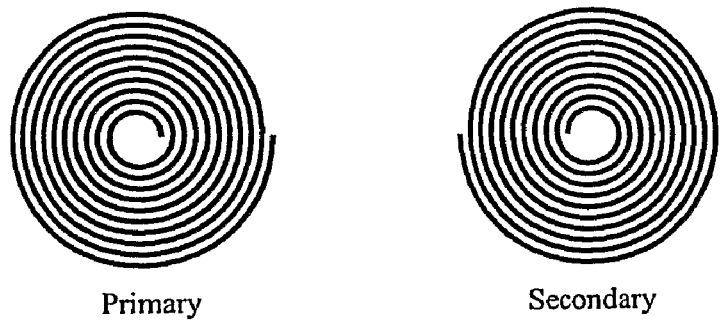
FIG. 3 shows typical prior art planar windings as may be applied for example to opposite sides of a printed circuit board.
Figure 4:
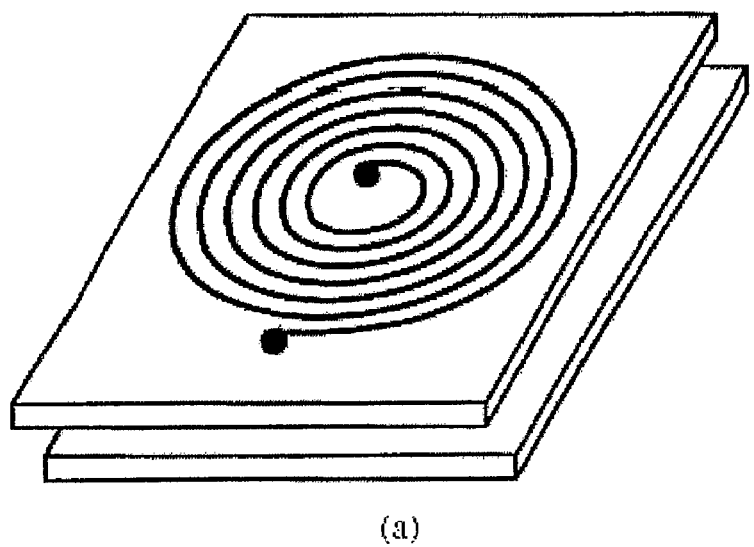
FIGS. 4A and 4B show respectively planar windings on two parallel planes and their use in a prior art battery charging platform.
Figure 4:
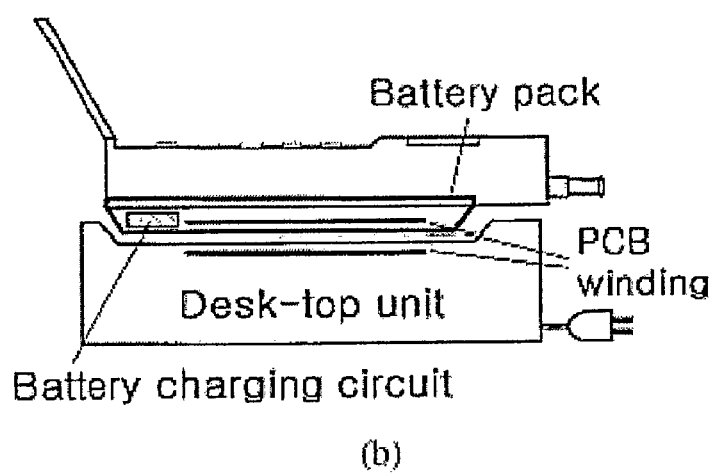
Figure 5:
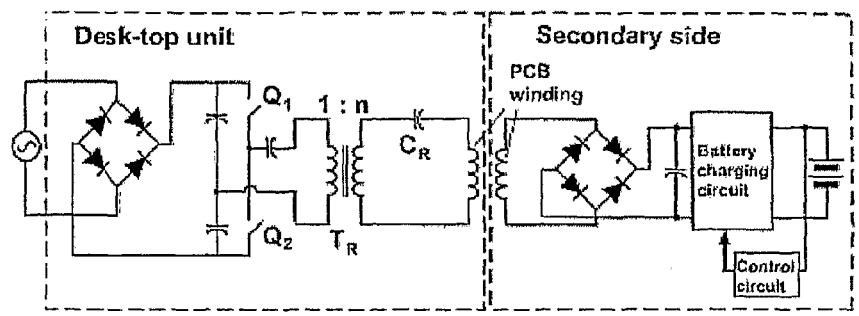
FIG. 5 shows the equivalent electrical circuit of the system of FIG. 4B, FIGS. 6A and 6B show respectively a single coil for generating a magnetic field with lines of flux flowing vertically into and out of the plane of the coil and a multi-layer structure for generating perpendicular lines of flux.
Figure 6A:
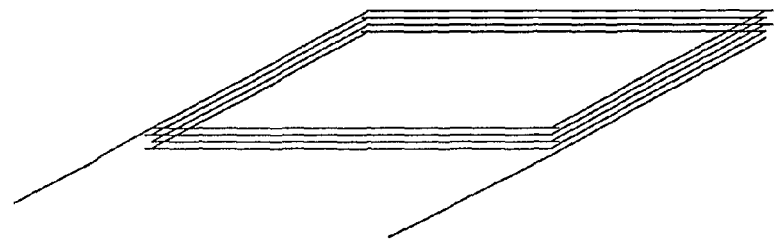
Figure 6B:
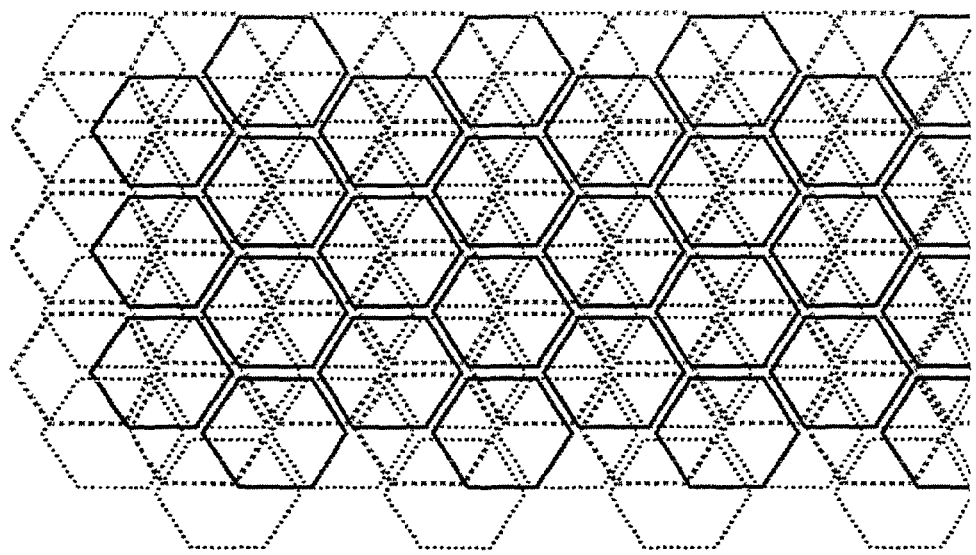
Figure 7:
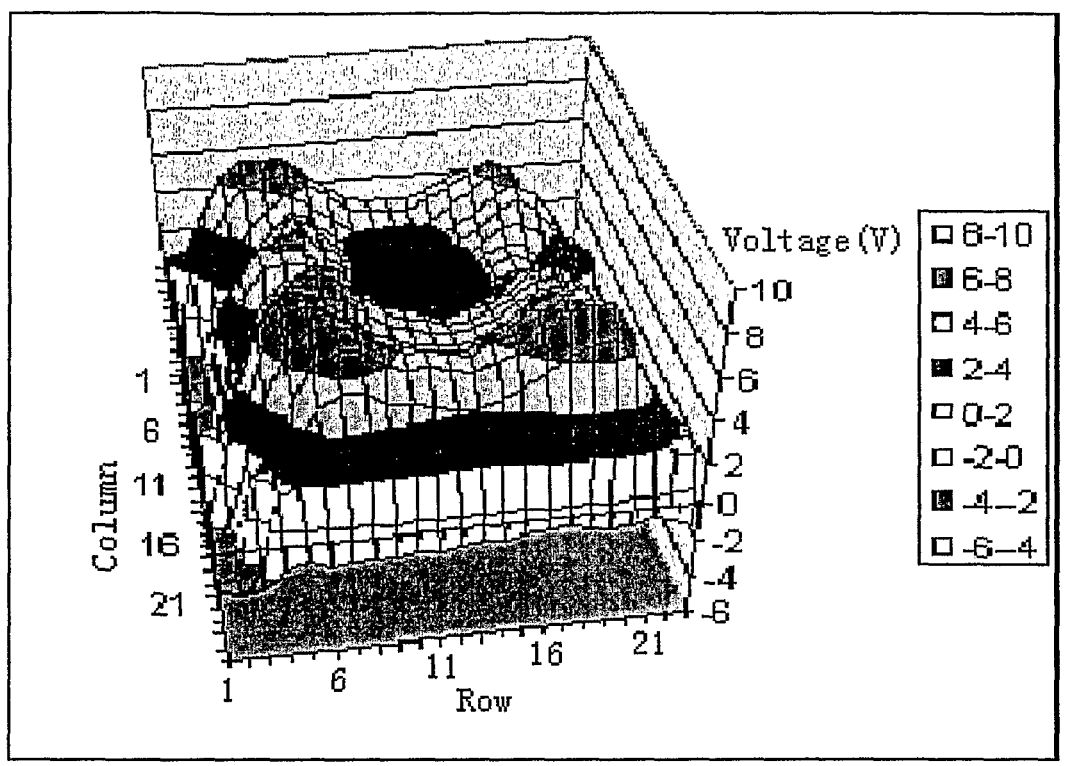
FIG. 7 shows the voltage induced in a secondary module placed on the surface of a prior art planar inductive charging platform.
Figure 8A:
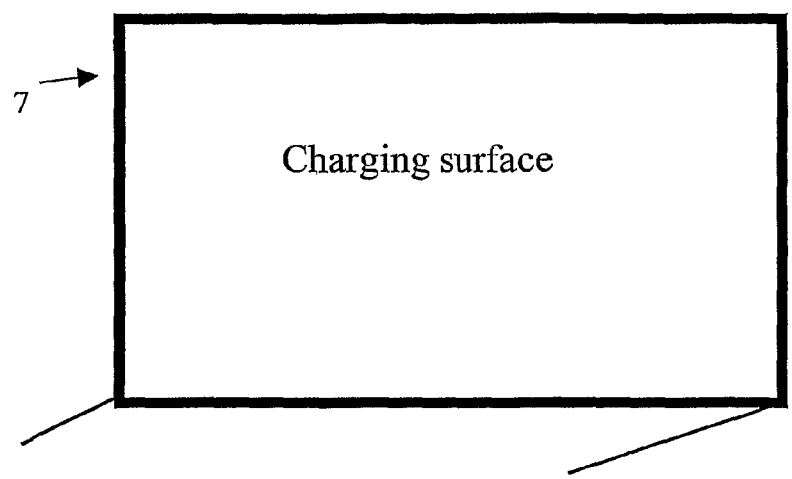
FIGS. 8A and 8B show respectively (a) a schematic of a planar charging platform and (b) a schematic of a planar charging platform according to an embodiment of the present invention.
Figure 8B:
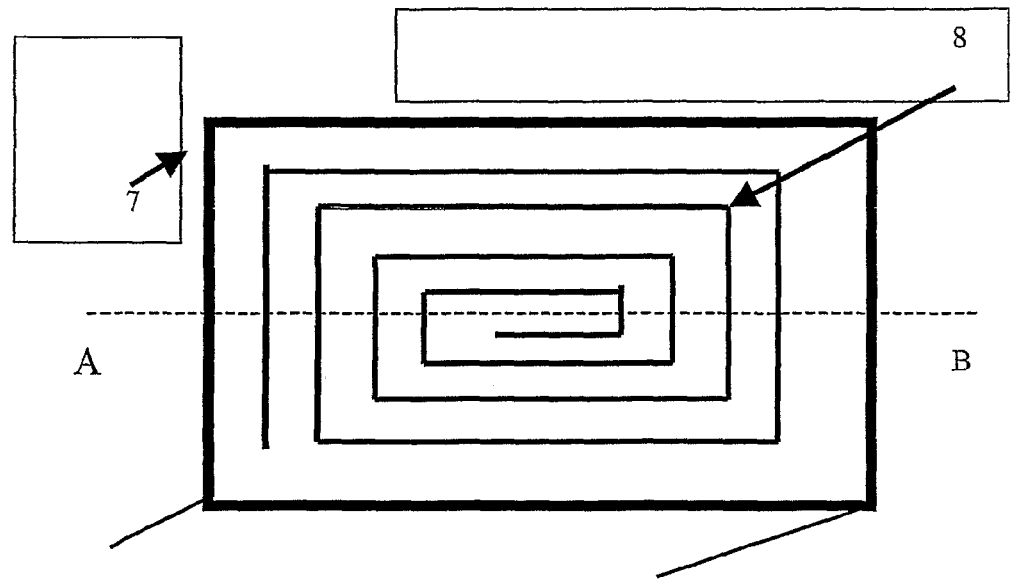

FIG. 8A shows a schematic of a planar inductive charging platform based on a single planar primary winding 7 that surrounds a charging surface. In this context the term "primary" is used in the same sense as a transformer, and the energy receiving element will comprises the "secondary". FIG. 8B shows a schematic of planar inductive charging platform with a second auxiliary winding according to an embodiment of the present invention. As can be seen from FIG. 8B, this embodiment of the present invention includes a first primary planar winding 7 that as in FIG. 8A surrounds the charging surface, but further includes a second spiral primary planar winding 8 that is located within an area defined by the first and principal primary winding. Preferably the second auxiliary winding is located generally concentrically with the principal winding so that the center of the spiral of the auxiliary winding is located in the center of the principal primary winding where the voltage sag is at its most extreme.

Figure 9:
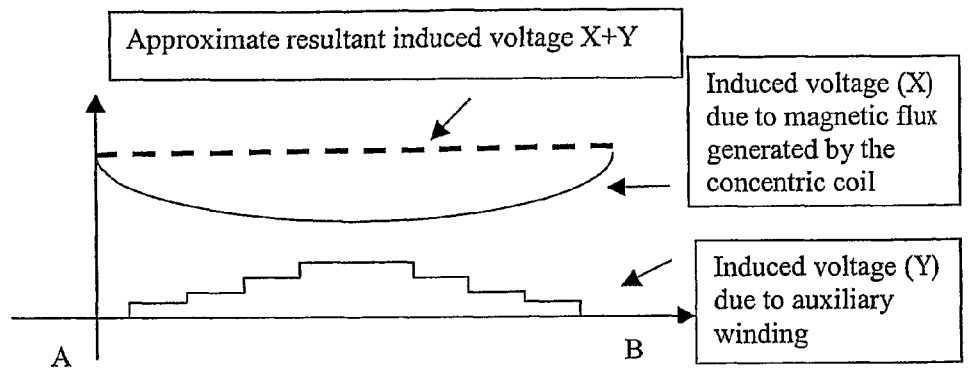
FIG. 9 illustrates the induced voltages due to the magnetic flux generated by the principal and auxiliary coils of the embodiment of FIG. 8B.
Figure 10:
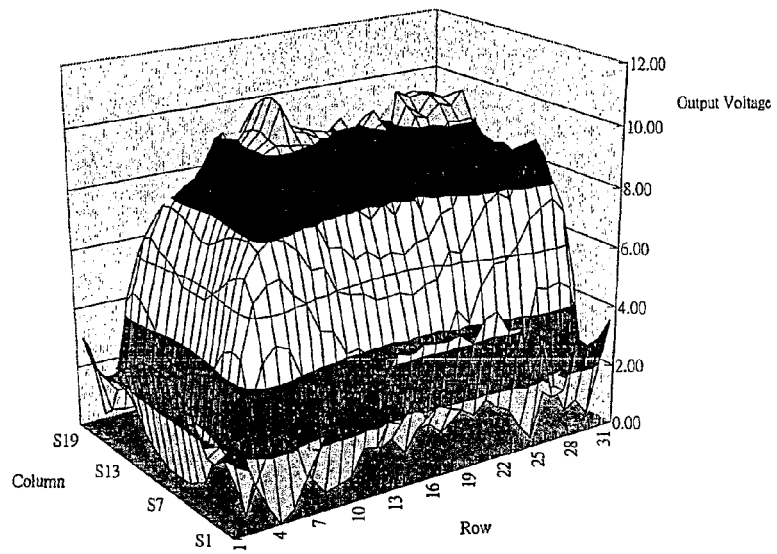
FIG. 10 illustrates the measured voltage picked up by an energy receiving element from the planar charging platform of the embodiment of FIG. 8(b).

FIG. 9 shows the corresponding induced voltages that would be picked up by the secondary module due to the two excited windings (the principal primary winding and the auxiliary winding). The additional voltage (Curve Y) due to the magnetic flux generated by the auxiliary winding in the central region compensates for the central voltage sag phenomenon in the planar charging platform. FIG. 10 shows a practical example of a charging platform with such an auxiliary winding excited in the same way as the first primary coil. It can be seen that the voltage sag is greatly reduced. This experimental result confirms the improvement of the charging ability of the charging platform due to the auxiliary winding.

It will be understood that the flux generated by the first primary winding is greater than the flux generated by the auxiliary second winding. The purpose of the second winding is to compensate for the voltage sag phenomenon and therefore the second winding is driven such that it generates sufficient flux to provide this compensation without going too far and resulting in a voltage peak where the second winding is located.

It will be understood that a number of variations on the embodiment illustrated in FIG. 8B are possible. For example the principal and auxiliary primary windings may be formed either as conductive coils or may be formed as conductive tracks on a printed circuit board (PCB). The principal and auxiliary windings may preferably be formed in the same plane (for example if they are formed on the same PCB), or may be formed in parallel but slightly spaced apart planes. In addition, while the windings are shown in FIGS. 8A and 8B in a rectangular form this is not essential and the windings may take other shapes such as circular windings.

The auxiliary winding should be located at or close to the part of the charging surface where the voltage sag occurs. Generally this may be in the center of the platform, but depending on the design of the principal winding if the sag occurs elsewhere then the auxiliary winding should be located correspondingly. Generally one auxiliary winding may be sufficient to compensate for the voltage sag but if not, for example if the charging surface is particularly large, then two or more auxiliary windings may be employed.

The principal and the auxiliary winding may be connected together in parallel or in series and may be driven in phase and the same polarity. Alternatively the auxiliary winding may be driven separately from the principal winding such that the flux generated by the auxiliary winding can be controlled so as to be sufficient to compensate for the voltage sag without generating any undesirable flux peak as it is desirable that the flux generated over the surface of the charging platform should be as uniform as possible.

It will be understood that in preferred embodiments the present invention is particularly suitable for use with planar windings where the lateral dimensions (e.g., width and length of a rectangular winding or circumference of a circular winding) are substantially greater than the thickness or height of the winding whether it is a very thin winding such as a conductive track on a PCB, or a slightly thicker winding formed by a wire coil. Such windings may be considered in a general sense to lie in a plane even though they will nevertheless have a defined thickness even if it is small. However the invention may also be applied to embodiments where the thickness or height of the winding becomes more significant and the term planar may not apply so readily.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A battery charging apparatus comprising:
   an inductive charging platform including a charging surface on which an electrical device to be charged is to be placed;
   a first winding for generating lines of magnetic flux generally perpendicular to the charging surface;
   and a second winding located within an area defined by the first winding for generating an auxiliary magnetic flux generally perpendicular to the charging surface, such that magnetic flux generated by said second winding compensates for a reduction in magnetic flux generated by said first winding, thereby generating magnetic flux substantially uniformly over the surface of the charging platform.

2. Apparatus as claimed in claim 1 wherein said second winding is located concentrically with respect to said first winding.

3. Apparatus as claimed in claim 1 wherein said first and second windings are planar windings.

4. Apparatus as claimed in claim 3 wherein said first and second planar windings are located in the same plane.

5. Apparatus as claimed in claim 3 wherein said first and second planar windings are located in parallel planes.

6. Apparatus as claimed in claim 1 wherein said first and second windings are formed as conductive coils.

7. Apparatus as claimed in claim 1 wherein said first and second windings are formed as conductive tracks on a printed circuit board.

8. Apparatus as claimed in claim 1 wherein said first and second windings are connected together in series or in parallel.

9. Apparatus as claimed in claim 1 wherein said first and second windings are driven in the same phase and the same polarity.

10. Apparatus as claimed in claim 1 wherein said first and second windings are driven independently.

11. Apparatus as claimed in claim 1 wherein said first winding extends about the periphery of the charging surface and wherein said second winding is located at the center of said charging surface.

12. Apparatus as claimed in claim 1 wherein said second winding is a spiral winding.

13. Apparatus as claimed in claim 1 wherein said first winding and said second winding are generally rectangular.

14. Apparatus as claimed in claim 1 wherein said first winding and said second winding are generally circular.

15. Apparatus as claimed in claim 1 wherein a third winding is provided located within said area defined by said first winding.

16. Apparatus as claimed in claim 1 wherein the magnitude of the flux generated by the first winding is greater than the magnitude of the flux generated by the second winding.

* * * * *